United States Patent [19]

Groth et al.

[11] Patent Number: 5,618,910

[45] Date of Patent: Apr. 8, 1997

[54] PROCESS FOR DECOLORIZING N-CONTAINING POLYMERS

[75] Inventors: Torsten Groth; Winfried Joentgen, both of Köln; Lutz Heuer, Krefeld; Gerd Schmitz, Leverkusen, all of Germany

[73] Assignee: Bayer AG, Leverkusen, Germany

[21] Appl. No.: 511,416

[22] Filed: Aug. 4, 1995

[30] Foreign Application Priority Data

Apr. 11, 1995 [DE] Germany ............. 195 13 718.3

[51] Int. Cl.⁶ ................................. C08G 69/10
[52] U.S. Cl. ................. 528/328; 528/363; 525/418; 525/419
[58] Field of Search ................... 528/328, 363; 525/418, 419

[56] References Cited

U.S. PATENT DOCUMENTS

| | | | |
|---|---|---|---|
| 4,363,797 | 12/1982 | Jacquet et al. | 424/70 |
| 4,839,461 | 6/1989 | Boehmke | 528/363 |
| 5,142,062 | 8/1992 | Knebel et al. | 548/545 |
| 5,286,810 | 2/1994 | Wood | 525/421 |
| 5,292,864 | 3/1994 | Wood et al. | 528/490 |
| 5,357,004 | 10/1994 | Calton et al. | 525/435 |
| 5,371,180 | 12/1994 | Groth et al. | 528/363 |
| 5,373,088 | 12/1994 | Koskan et al. | 528/363 |

FOREIGN PATENT DOCUMENTS

| | | |
|---|---|---|
| 0650995 | 5/1995 | Germany. |
| WO-A-9215869 | 9/1992 | WIPO. |
| WO93/23452 | 11/1993 | WIPO. |

OTHER PUBLICATIONS

*Synthesis of α,β–Poly[(2–hydroxyethyl)–D L–aspartamide]*, a New Plasma Expander, Journal of Medicinal Chemistry, pp. 893–897, vol. 16, No. 8 (1973).

*Chemical Studies of Polyaspartic Acids*, pp. 1084–1091, J. Org. Chem., vol. 26 (Apr. 1961).

Orbit Abstract of EP 0 650 995 (May 3, 1995).

Patent Abstracts of Japan, vol. 018, No. 191 (C–1186), Apr. 4, 1994 abstract of JP–A–05 345821 (Tosoh Corp), Dec. 27, 1994.

Database WPI, Section Ch, Week 9409, Derwent Publications Ltd., London, GB, Abstract of JP–A–06 025 410 (Delamine BV), Feb. 1, 1994.

*Primary Examiner*—James J. Seidleck
*Assistant Examiner*—Duc Truong
*Attorney, Agent, or Firm*—Connolly & Hutz

[57] ABSTRACT

N-containing polymers having repeating succinyl units are decolorized using activated hydrogen.

20 Claims, No Drawings

PROCESS FOR DECOLORIZING N-CONTAINING POLYMERS

The invention relates to a process for decolorizing N-containing polymers having repeating succinyl units using activated hydrogen.

The preparation and use of polyaspartic acid (PAA) and its derivatives has for a long time been the subject-matter of numerous publications and patents.

According to J. Org. Chem. 26, 1084 (1961), the preparation of polyaspartic acid and its salts is performed by the thermal polycondensation of aspartic acid via the intermediate polysuccinimide (PSI). PSI can be converted to PAA by hydrolysis.

A lightening in color of the polymer is achieved here by recrystallization via the copper salt, subsequent removal of the copper by precipitation as copper sulfide and subsequent dialysis of the free acid against water.

In U.S. Pat. No. 4,363,797, the preparation of a polyaspartic acid which is only lightly colored by polycondensation of an aspartic acid suspension in a high-boiling solvent in the presence of an ion exchanger is described.

Furthermore, the use of 85% strength aqueous phosphoric acid as a catalyst in the polycondensation of aspartic acid has been repeatedly specified (DE-A-4 023 463, J. Med. Chem. 16, 893 (1973)). In this case, a virtually colorless polysuccinimide is obtained.

The abovementioned methods for lightening the color all relate to the preparation of polyaspartic acid from aspartic acid. They are not applicable to processes for the preparation of polyaspartic acid starting from maleic anhydride and ammonia as are described, for example in U.S. Pat No. 4,839,461 or WO 93/23452.

U.S. Pat. No. 5,292,864 describes a process for lightening the color of polyaspartic acid and its copolymers with amines using oxidizing substances such as hypochlorite, chlorine, chlorine dioxide, hydrogen peroxide or ozone. In Example 11 of the patent the attempt to decolorize polyaspartic acid, sodium salt, under hydrogenating conditions on a palladium catalyst is described. The result recorded was that a lightening in color did not occur, presumably because of insufficient activation of the hydrogen.

The object underlying the invention is to provide an improved process for decolorizing N-containing polymers having repeating succinyl units, in particular polyaspartic acid.

The invention relates to a process for decolorizing N-containing polymers having repeating succinyl units, which comprises carrying out the decolorization using activated hydrogen. The decolorization takes place in this case under hydrogenating conditions. In a preferred embodiment, the polymer to be decolorized is a polyaspartic acid or a derivative thereof. In the context of the present invention polymers, in particular polyaspartic acids, are also taken to mean the salts of these compounds. Particularly preferred derivatives are, in particular, alkali metal salts such as polyaspartic acid sodium salt, amine salts and the amides, for example polyasparagine.

In a particularly preferred embodiment, the polymers contain repeating units of at least one of the following structures

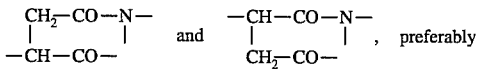

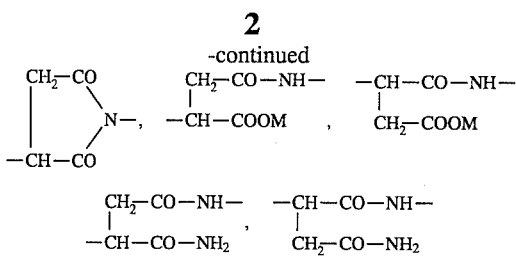

in which
M=independently of each other on multiple occurrence H, alkali metal, $NH_4^\oplus$ or $NR_4^\oplus$,
R=independently of each other H, alkyl, in particular having 1–12 C atoms, hydroxyalkyl having 1 to 8 C atoms.

In a particularly preferred embodiment the polymer contains at least 50% by weight of repeating units of the structures

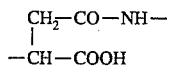

in the acid or salt form.

In a further preferred embodiment, other, if appropriate repeating iminodisuccinate units are contained in the polymer, such as

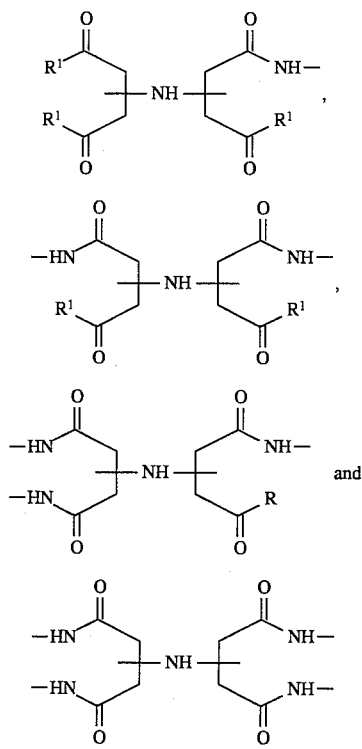

in which $R^1$ denotes OH, $O^-NH_4^+$ or $NH_2$, and/or

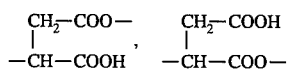

the acid or salt form.

The polymer prepared, depending on the reaction conditions, e.g. residence time and temperature of the thermal polymerization, shows different chain lengths or molecular weights after gel permeation chromatographic analysis generally $M_w$=500 to 10,000, preferably 500 to 5,000, particularly preferably 700 to 4,500. The proportion of the β-form is generally more than 50%, in particular more than 70%, based on the sum of the repeating units

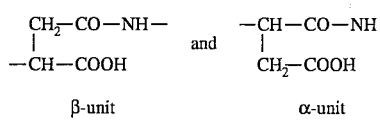

The iminodisuccinate units can be present in the polymer in random distribution or, preferably, as an end group. The iminodisuccinate unit is in general present to the extent of at least 0.1 mol %, based on the sum of all the repeating units. The molar ratio the iminodisuccinate units incorporated in the polymer is preferably 0.1 mol % to 99 mol %, preferably 1 mol % to 50 mol %, particularly preferably 2 mol % to 25 mol %.

The activated hydrogen to be used according to the invention can be prepared in different ways, in particular in this case this relates to a) nascent hydrogen, as formed in the dissolution in aqueous solutions of base metals whose redox potential is below that of hydrogen, b) hydridic hydrogen from metal hydrides, c) molecular hydrogen in the presence of hydrogenation catalysts at elevated pressure and elevated temperature.

As a source for nascent hydrogen a), all base metals are suitable whose redox potential is below that of hydrogen and which can therefore release hydrogen from aqueous solutions. Preference is given to iron, magnesium, aluminum and zinc.

Particularly preferred metal hydrides b) are magnesium hydride, calcium hydride, aluminum hydride and boron hydride.

Preferred hydrogenation catalysts for the activation c) of molecular hydrogen are noble metal catalysts on carbon such as palladium, platinum, rhodium or ruthenium or Raney catalysts such as Raney iron, Raney nickel or Raney palladium. The reduction is carried out, if necessary, under elevated pressure in order to saturate the reaction solution with hydrogen. The reaction is preferentially carried out at 10 to 200 bar, preferably at 20 to 150 bar and particularly preferably at 20 to 100 bar hydrogen pressure. The reaction times are preferentially between 0.5 and 12 h, preferably between 0.5 and 6 h, in particular between 0.5 and 3 h. The decolorization in this case can also be carried out discontinuously, eg. in a stirred tank, or continuously in a delay tube.

In the decolorization process according to the invention, both polyaspartic acids which are obtainable by thermal polycondensation of aspartic acid or asparagine and also those which were prepared from maleic acid derivatives such as maleic anhydride or maleic acid or fumaric acid derivatives and ammonia can be used.

The application further relates to the decolorization of polyaspartic acids, their derivatives and copolymers by a combination of reductive decolorization using activated hydrogen and subsequent further lightening of color using oxidizing agents. In this case the crude product is partially decolorized by one of the above-described processes under hydrogenating conditions.

In a preferred embodiment, for further lightening of color, a treatment with an oxidizing agent can be carried out before or after the selective decolorization. Oxidizing agents which are suitable are air or oxygen in the presence of an oxidation catalyst, hydrogen peroxide, ozone, inorganic peroxides, inorganic percarbonates, eg. sodium percarbonate, inorganic persulfates, sodium perborate, chlorine, hypochlorites, chlorine dioxide. The substances having oxidizing action are added to the aqueous solution to be lightened in color preferentially at 0.001 to 10% by weight, advantageously at 0.01 to 5% by weight based on the solids contained in the solution. The decolorization reaction is preferentially carried out at temperatures above 40° C., preferably at 40° C. to 150° C., if appropriate under pressure. The reaction times are preferentially between 0.5 and 12 h, preferably between 0.5 and 6 h.

The products prepared by the processes according to the invention have a significant lightening in color in comparison to the crude products, without the application properties being negatively influenced. The products according to the invention are therefore particularly suitable for use in areas of application where the colorlessness of the end product is of importance, for example as a dispersant for white pigments in cosmetic applications or detergent applications.

For the decolorization, the substances supplying the activated hydrogen are added to the solution to be decolorized generally at 0.01 to 5% by weight, preferably at 0.1 to 2.5% by weight and particularly preferably at 0.2 to 1.5% by weight, based on the solids to be decolorized.

The decolorization is preferentially carried out at temperatures of 20° C. to 150° C., if appropriate under pressure. The reaction times are preferably between 0.5 and 12, preferably 0.5 and 6, and particularly preferably between 0.5 and 3, hours.

The reaction can be carried out discontinuously in a stirred reactor or continuously, eg. in a delay robe.

EXAMPLES

The lightening in color was evaluated optically in transmission by comparison using 40% strength aqueous solutions in a cuvette having 2 cm diameter.

Example 1

Decolorization by hydrogenation using molecular hydrogen on a palladium/pulverulent carbon catalyst 100 g of a 45% strength polyaspartic acid, sodium salt, solution which has been prepared from aspartic acid by thermal polycondensation and subsequent hydrolysis using sodium hydroxide solution were heated at 100° C. for 2 h with 1 g of a 5% palladium/pulverulent carbon catalyst at 20 bar $H_2$ pressure. The originally dark red solution decolorized to give orange. Structural properties such as molecular weight distribution and application parameters such as calcium carbonate dispersion capacity were unchanged.

Example 2

Decolorization by hydrogenation using molecular hydrogen on a palladium/lump carbon fixed-bed catalyst 100 g of a 45% strength polyaspartic acid, sodium salt, solution which has been prepared by thermal polymerization of maleic anhydride with ammonia at 220° C. and subsequent hydrolysis with sodium hydroxide solution were decolorized in a fixed-bed reactor under 50 bar $H_2$ pressure at 130° C. and a residence time of 2 h. A light orange solution was obtained from the originally dark-brown crude solution.

Example 3

Decolorization by hydrogenation on a Raney-iron catalyst 100 g of a 45% strength polyaspartic acid, sodium salt, solution (preparation as described in Example 2) were hydrogenated under 90 bar $H_2$ pressure at 150° C. for 0.5 h.

The originally dark-brown crude solution decolorized to give orange.

Example 4

Reaction with zinc powder 100 g of a 45% strength aqueous polyaspartic acid, sodium salt, solution prepared as in Example 2 are admixed with 0.5 g of zinc powder, heated to 80° C. and stirred for 1 h at this temperature. (At 50° C. the development of nascent hydrogen is slowly initiated). After the reaction is complete, the mixture is filtered off from the zinc. The dark-brown solution has decolorized to give orange.

Example 5

Decolorization as in Example 4, but using 0.5 g of aluminum powder instead of zinc. Lightening in color from dark brown to light orange occurred.

Example 6

Decolorization as in Example 4 using 0.5 g of magnesium powder. Lightening in color from dark brown to yellowish orange occurred.

Example 7

Decolorization of a polyaspartic acid copolymer

A copolymer was prepared by thermal polymerization in the melt at 200° C. of maleamic acid, ammonium salt, and acrylic acid, ammonium salt. A reddish-brown solid was obtained which, after hydrolysis with sodium hydroxide solution and dissolution in water, gave a dark brown 45% strength aqueous solution. 100 g of this solution were heated with 0.5 g of zinc powder-coal at 80° C. for 1 h. A lightening in color to give orange again occurred here.

Example 8

Decolorization of a polyaspartic acid derivative

A polysuccinimide which had been prepared by polymerization of maleamic acid at 160° C. to 180° C. in a screw was dissolved in DMF and partially opened using 3 mol % of stearylamine. After the solvent was removed, a reddish solid was obtained. The still unopened succinimide groups of the amine derivative were then opened using sodium hydroxide solution to give the sodium salt. 100 g of a 45% strength aqueous solution of this compound were reacted under 40 bar H: pressure with 1 g of a 5% strength palladium/powder catalyst at 110° C. for 2 h. A lightening in color from red to yellowish orange occurred here.

Example 9

Decolorization of a polyaspartic acid derivative by the combination of reductive and oxidative methods 100 g of a 45% strength aqueous solution of the polyaspartic acid derivative lightened in accordance with Example 8 were admixed with 1 g of a 30% strength $H_{2O2}$ solution and heated at 50° to 80° C. for 1 h. A lightening in color from yellowish orange to light yellow occurred here.

We claim:

1. A process for decolorizing N-containing polymers having repeating succinyl units, which comprises carrying out decolorization with activated hydrogen at elevated pressure, wherein the activated hydrogen is a) nascent hydrogen, as formed in the dissolution in aqueous solutions of base metals whose redox potential is below that of hydrogen;

b) hydridic hydrogen from metal hydrides; or c) molecular hydrogen in the presence of hydrogenation catalysts.

2. The process as claimed in claim 1, wherein the polymer is a polyaspartic acid or a derivative thereof.

3. The process as claimed in claim 1, wherein the polymer contains repeating units of at least one of the following structures

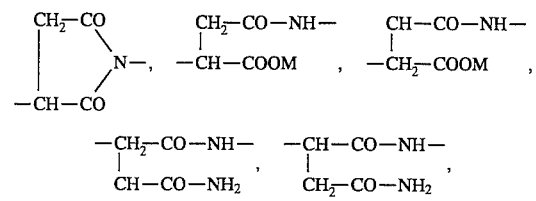

in which

M=independently of each other on multiple occurrence H, alkali metal, $NH_4^\oplus$ or $NR_4^\oplus$, R=independently of each other H, alkyl, in particular having 1–12 C atoms, hydroxyalkyl having 1 to 8 C atoms, or a salt thereof.

4. The process as claimed in claim 1, wherein the polymer contains at least 50% by weight of repeating units of the structures

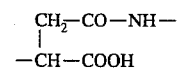

or a salt thereof.

5. The process as claimed in claim 1, wherein the polymer is a copolymer which, additionally to the repeating succinyl units, contains repeating units of the following formulae

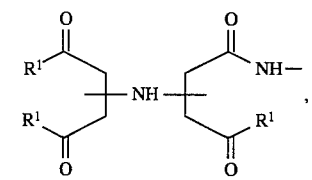

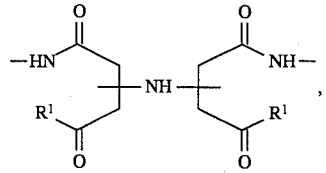

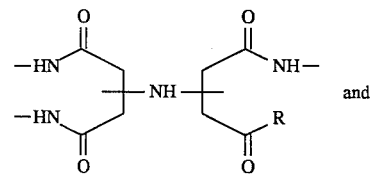 and

-continued

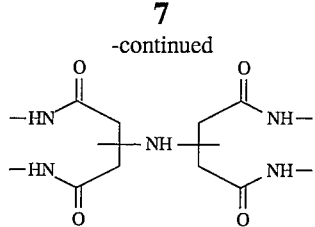

in which $R^1$=OH, $O^-NH_4^+$ or $NH_2$ or a salt thereof.

6. The process as claimed in claim 1, wherein the activated hydrogen is molecular hydrogen in the presence of a hydrogenation catalyst at elevated temperature.

7. The process as claimed in claim 6, wherein the catalyst is a noble metal catalyst or a Raney catalyst.

8. The process as claimed in claim 1, wherein the activated hydrogen is nascent hydrogen.

9. The process as claimed in claim 8, wherein the nascent hydrogen is obtained by the dissolution of base metals in the reaction solution.

10. The process as claimed in claim 1, wherein the activated hydrogen used is hydridic hydrogen.

11. The process for decolorizing N-containing polymers as claimed in claim 1, wherein an oxidative treatment of the N-containing polymers is additionally carried out.

12. The process as claimed in claim 1, wherein the decolorization is carried out at temperatures of from 20° C. to 150° C.

13. The process as claimed in claim 1, wherein the decolorization is carried out at temperatures of from 50° C. to 150° C.

14. The process as claimed in claim 1, wherein the decolorization is carried out at pressures of from 10 to 200 bar.

15. The process as claimed in claim 1, wherein the decolorization is carried out at pressures of from 20 to 150 bar.

16. The process as claimed in claim 1, wherein the decolorization is carried out for a time of from 0.5 to 12 hours.

17. The process as claimed in claim 1, wherein the decolorization is carried out for a time of from 0.5 to 6 hours.

18. The process as claimed in claim 1, wherein the decolorization step results in said N-containing polymers having a lighter color than before the decolorization process.

19. The process as claimed in claim 2, wherein the decolorization step results in said N-containing polymers having a lighter color than before the decolorization process.

20. The process as claimed in claim 3, wherein the decolorization step results in said N-containing polymers having a lighter color than before the decolorization process.

* * * * *

UNITED STATES PATENT AND TRADEMARK OFFICE
CERTIFICATE OF CORRECTION

PATENT NO. : 5,618,910
DATED : APRIL 8, 1997
INVENTOR(S) : GROTH ET AL.

It is certified that error appears in the above-indentified patent and that said Letters Patent is hereby corrected as shown below:

In Column 6, lines 15-19 (Claim 3),

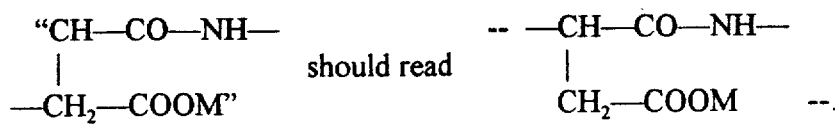

In Column 6, lines 20-23 (Claim 3),

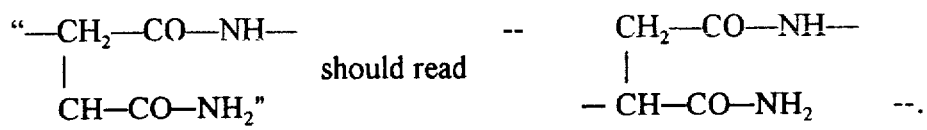

In Column 6, line 26 (Claim 3), "or NR$_4^*$," should be --or NR$_4^*$,--.

Signed and Sealed this

Nineteenth Day of August, 1997

Attest:

BRUCE LEHMAN

Attesting Officer

Commissioner of Patents and Trademarks